Sept. 29, 1953                I. M. RILES ET AL                2,653,507
                           HIGH-SPEED GRID CAMERA
Filed Sept. 16, 1949                                       7 Sheets-Sheet 3
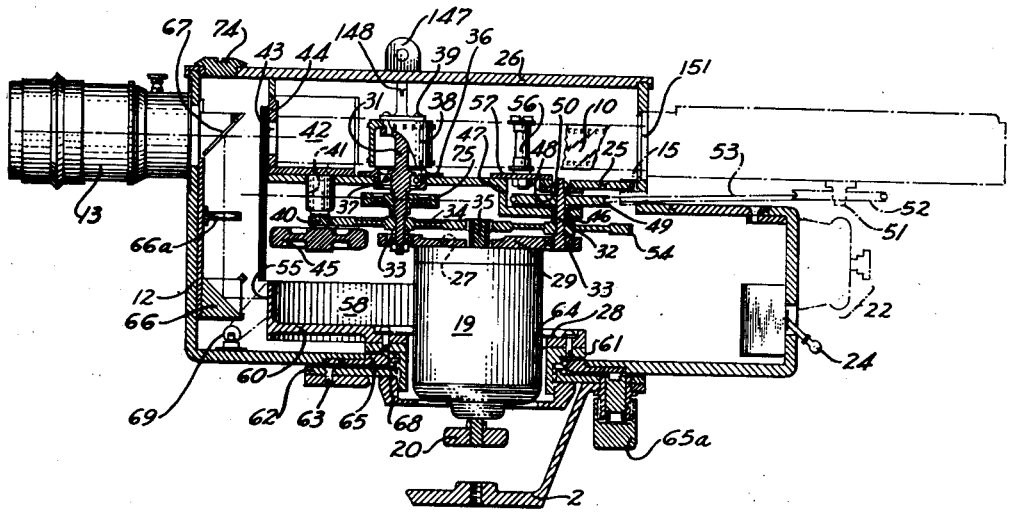
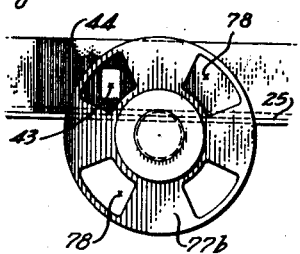
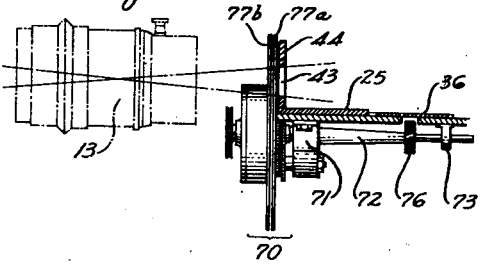
INVENTORS:
IRA M. RILES
DAVID W. STRATTON
BY
Herbert E. Metcalf
ATTORNEY Sept. 29, 1953

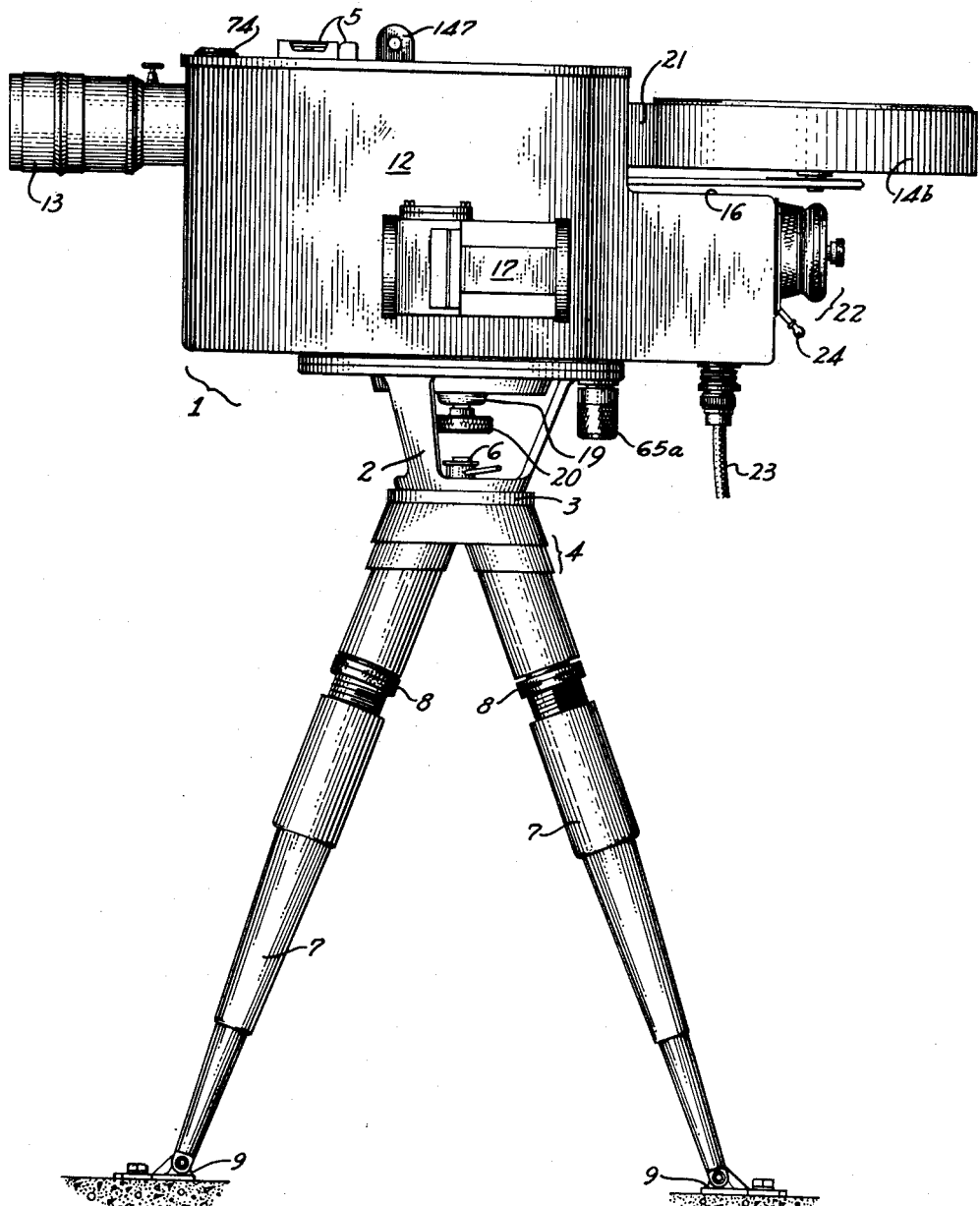

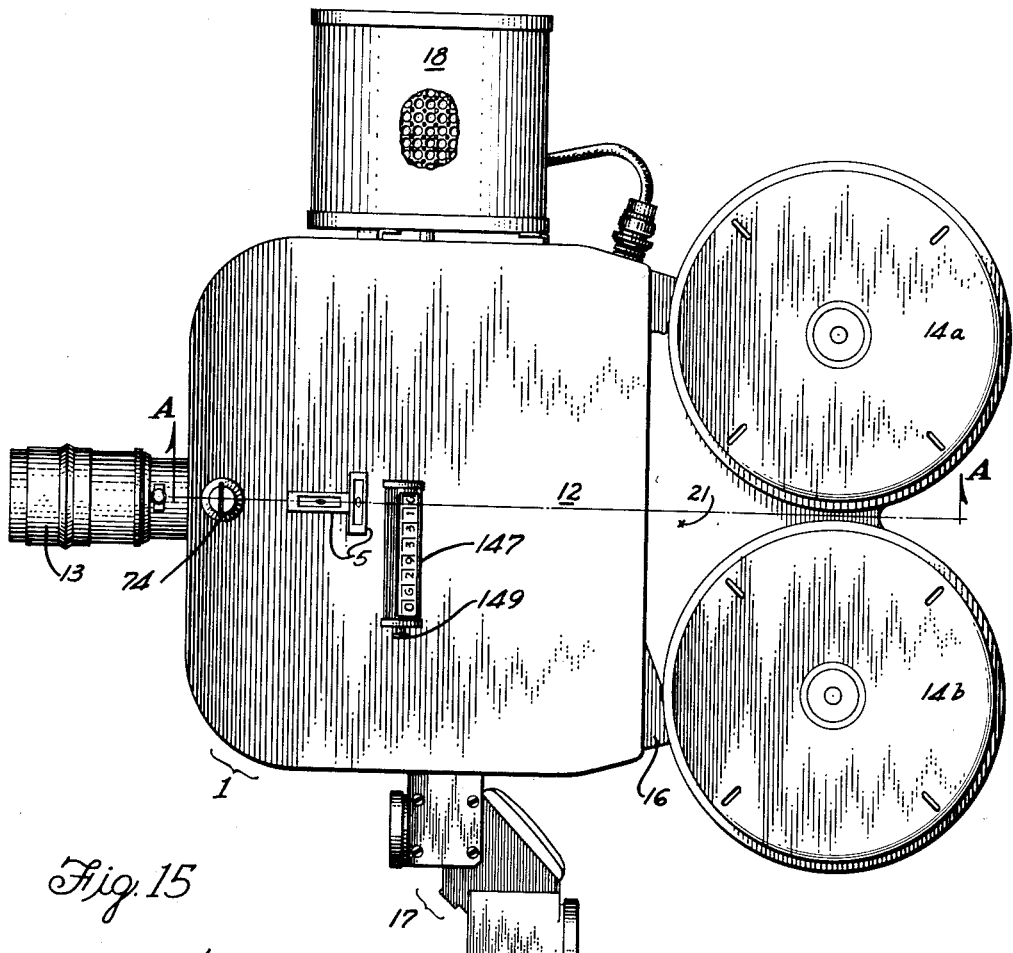
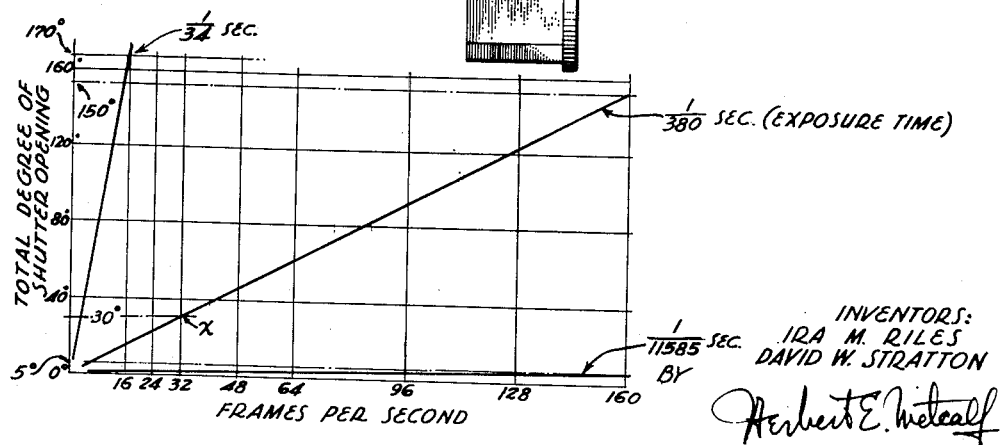

I. M. RILES ET AL 2,653,507

HIGH-SPEED GRID CAMERA

Filed Sept. 16, 1949

INVENTORS:
IRA M. RILES
DAVID W. STRATTON
BY
Herbert E. Metcalf
ATTORNEY

Sept. 29, 1953  I. M. RILES ET AL  2,653,507
HIGH-SPEED GRID CAMERA
Filed Sept. 16, 1949  7 Sheets-Sheet 5

INVENTORS:
IRA M. RILES
DAVID W. STRATTON
BY
Herbert E. Metcalf
ATTORNEY

INVENTORS:
IRA M. RILES
DAVID W. STRATTON
BY
Herbert E. Metcalf
ATTORNEY

Sept. 29, 1953  I. M. RILES ET AL  2,653,507
HIGH-SPEED GRID CAMERA
Filed Sept. 16, 1949  7 Sheets-Sheet 7
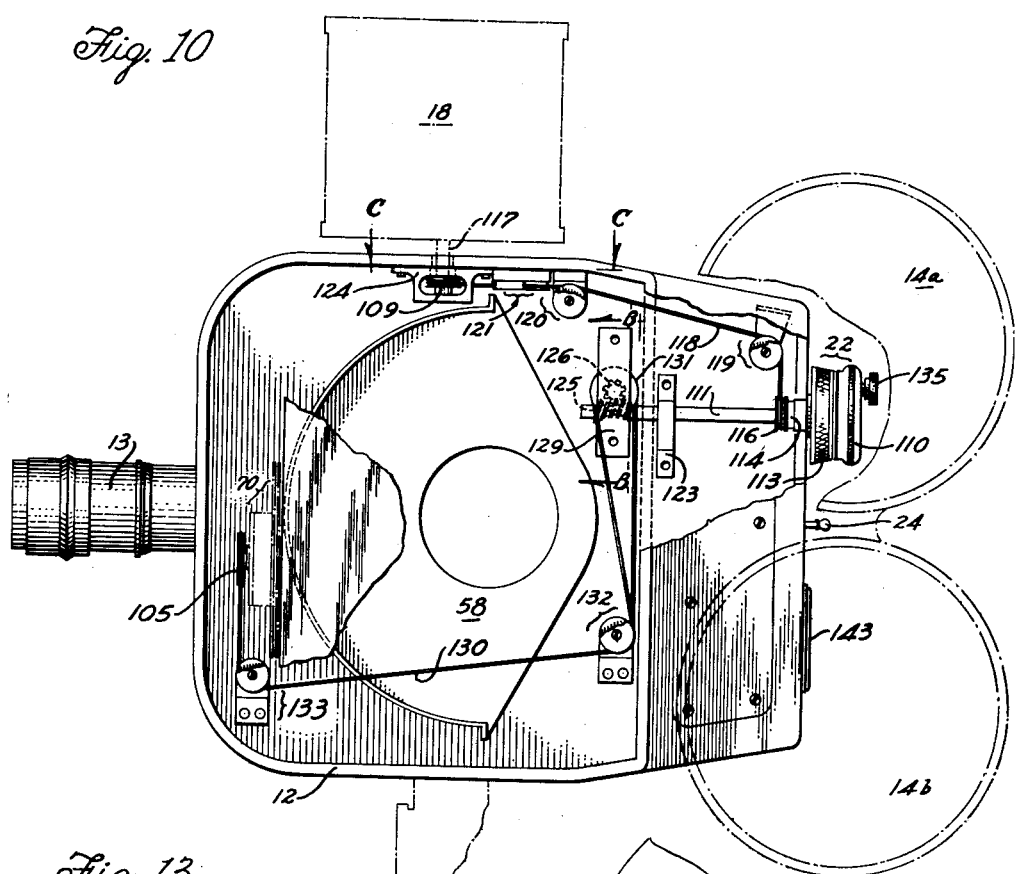
INVENTORS:
IRA M. RILES
DAVID W. STRATTON
BY
Hubert E. Metcalf
ATTORNEY Patented Sept. 29, 1953

2,653,507

UNITED STATES PATENT OFFICE 2,653,507

HIGH-SPEED GRID CAMERA

Ira M. Riles, Manhattan Beach, and David W. Stratton, Inglewood, Calif., assignors to Northrop Aircraft, Inc., Hawthorne, Calif., a corporation of California Application September 16, 1949, Serial No. 115,972

2 Claims. (Cl. 88—18)

This invention relates to movie cameras and more particularly to a high-speed, grid camera useful for tracking purposes.

In cameras to be used for photographing moving objects, such as test missiles, for example, it is desirable, when the camera is running, to be able to readily change the film frame speed while still maintaining a desired constant film exposure time.

By this means, during photographing of test work for example, the operator is enabled to increase the speed of the camera if some action of unusual importance happens to the object being photographed. Thus, a slow motion study of this action is made available which may be of great help in determining its cause.

Furthermore, by being able to change the film frame speed of such a camera, at will, a great saving in film results, since, if the camera had to be running at high speed for an entire test in order to ensure getting the detail of the crucial action, most of the film may have been used for photographing unimportant actions. Moreover, running at high speed for the entire length of a test uses film up rapidly, hence the present invention permits a relatively longer running time for one film loading of the camera.

In high speed test cameras it is further desirable to be able to superimpose onto the film a reticle or grid. Thus providing means for positively identifying the position and movement of objects photographed with respect to known reference points.

When attempting to orient objects by such means to a high accuracy, it is very important that the grid lines superimposed on the film be maintained extremely accurate, since even slight aberrations in their relative relation, such as due to temperature effects, can cause appreciable error in the tracking data.

Among the objects of this invention are:

To provide a novel relative arrangement of parts for providing a high speed tracking camera.

To provide a novel means for maintaining a constant exposure time when the film frame speed is varied while running a movie camera.

To provide a novel means for varying the shutter opening of a movie camera.

To provide a novel means of indicating accurate orientation in space of objects photographed by a movie camera.

To provide a novel optical arrangement in a movie camera for reflecting a reticle onto the image plane.

Briefly, this invention consists of the construction, combination, location, and relative arrangements of parts for obtaining a high speed movie camera. In the preferred embodiment of the invention, a rheostat controlled motor is provided for actuating a mechanism which intermittently feeds the film past a film gate in the camera box. A variable shutter is provided for controlling the opening time of the film gate. A planetary gearing system, driven by the motor, rotates the shutter and provides the means for varying the aperture of the shutter. An external control means is connected to both the rheostat and the planetary gearing system of the shutter in such a manner that a single adjustment of the external control means enables a constant exposure time to be maintained while the film speed is being varied. The external control means can also be adapted for permitting independent regulation of the rheostat and the shutter aperture.

In addition, a reticle constructed of a low expansion alloy is so mounted in the camera that it remains stationary while the camera box and the associated attachments, including the objective lens, sweep the arc of the reticle. Graduations marked on the reticle are reflected by an optical arrangement, also moving with the camera box, so as to be superimposed on the film frame along with the image of the object being photographed.

This invention can be more fully understood by reference to the drawings, in which:

Figure 1 is a side view of the preferred embodiment of a high-speed, grid camera mounted on a tripod and showing the general arrangement of the attachments on the camera box.

Figure 2 is a top view of the camera box showing the arrangement of the attachments.

Figure 3 is an elevation cross-sectional view of the camera box taken at section A—A of Figure 2 showing the arrangement of the camera driving mechanism, the reticle assembly, and the reticle reflecting system.

Figure 7 shows the side view of the shutter assembly as mounted in the optical path of the camera.

Figure 8 shows the location of the film gate with respect to the shutter aperture.

Figure 10 is a plan view of the lower half of the camera box showing the pulley drive arrangement.

Figure 13 is a view of the shutter pulley drive taken at line B—B of Figure 10.

Figure 14 is a view of the rheostat pulley drive and roller guides as taken at line C—C of Figure 10.

Figure 15 is a graph illustrating how the film speed is made to vary with the shutter aperture to give a constant exposure time.

Figure 4:
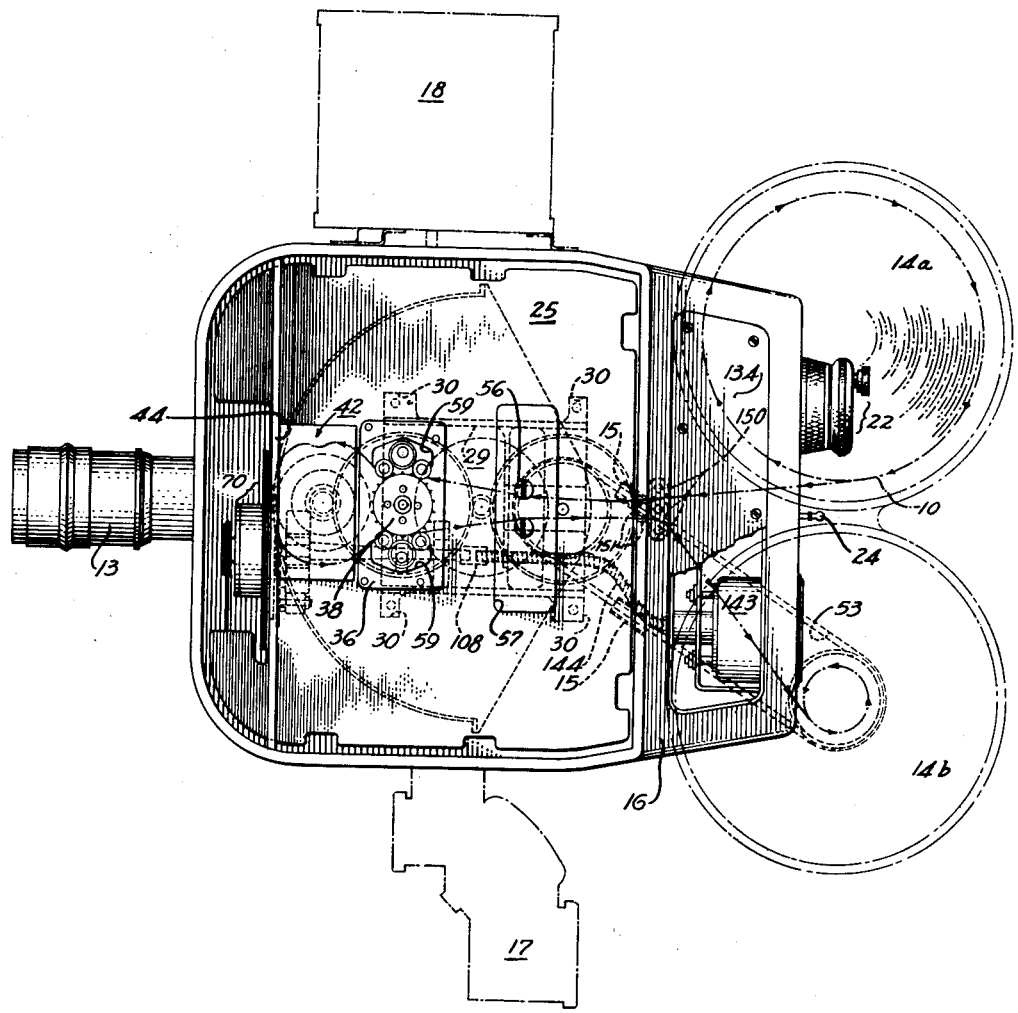
Figure 4 is an inside plan view of the upper half of the camera box showing the film driving mechanism and the path the film takes through the camera.

Referring first to Figure 1, a preferred embodiment of the high-speed, grid camera is illustrated. Here the camera 1 is shown to be mounted on a cone shaped mount 2 which in turn rests on the friction head 3 of a tripod 4. A locking nut 6 is used for locking the camera 1 to the tripod 4. The legs 7 of the tripod 4 are made adjustable in height by knurled collars 8. The tripod 4 is preferably fixed in position and well anchored at the base shoes 9 so as to provide a reference base for the camera indexing. Two bubble levels 5 placed at 90° with respect to each on top of the camera, help in positioning the camera.

The high-speed camera is made up largely of the main housing or camera box 12 with the necessary accessories attached thereto. These latter, as shown in Figures 1 and 2, are conventional components and include the variable lens focussing assembly 13 mounted horizontally on the front of the camera; the film drums 14a and 14b, held by a drum bracket 21, and positioned horizontally with respect to a shelf 16 provided at the rear of the camera box 12; a tracking viewer 17 attached to the near side; and a ventilated rheostat 18 attached to the far side of the camera box 12. Rheostat 18 is mounted in such a manner that it is removable to facilitate putting the camera in its carrying case.

As shown in Figure 1, a motor 19 having a hand positioning knob 20 extends downward slightly below the bottom of the box 12. Motor 19, whose speed is controlled by the rheostat 18, feeds the film from the film drum 14a past the image plane provided in the interior of the camera box 12 by lens assembly 13.

A double control knob assembly 22 is provided at the rear of the camera box 12. This control assembly knob 22 provides the means for changing the film frame speed of the camera while still maintaining a constant exposure time for the film as will be explained in the ensuing discussion.

An electrical lead 23 attached to the bottom of the camera box 12 feeds the necessary D. C. voltage required by motor 19. An initiating switch 24, located below control knob assembly 22 energizes the motor 19 for starting the camera running.

Figure 3 shows an elevation view of the camera box 12 taken at section A—A of Figure 2. A main base plate 25 having the general contour of the detachable top 26 of the camera box 12, except for a cut-out at the front for accommodating a shutter, is mounted inside the box 12.

In order to facilitate servicing the camera, all the gearing and film actuating mechanisms are so arranged that they can be mounted onto the main plate 25 outside the camera and inserted into the camera box as a unit. The main base plate 25, in general, divides the box horizontally into two compartments.

The top compartment of the box 12 is in line with the image optical path of the camera and contains the film guiding and moving mechanism. The bottom compartment contains the camera driving mechanism, the reticle arrangement, and the main bearing mount.

As shown in Fig. 3, the motor 19, which is a direct current intermittent duty motor is almost entirely enclosed within the camera box 12. Motor 19 is controlled by two rheostats 18 mounted in tandem. One rheostat controls the field and the other controls the armature of the motor 19 to give a speed variation of from 960 to 9600 R. P. M. Motor 19 is attached by screws 27 to a bracket 29. Figure 4 shows the plan view of the bracket 29 and indicates that it is suspended below the main base plate 25 by lugs 30 located at each of its corners.

Two shafts, the film drive shaft 31 and the drum drive shaft 32 extend upwardly from the base of the bracket 29 and have their lower ends rotatably mounted therein by roller bearings 33. A film drive gear 34 is keyed to the lower portion of the film drive shaft 31 and is driven by motor pinion 35 of motor 19. Film drive shaft 31 extends through the main base plate 25. An attachment plate 36 secured to main base plate 25 contains a second roller bearing 37 by which the central portion of drive shaft 31 is rotatably supported. On the flanged upper end of film drive shaft 31 a film sprocket 38 is held, just above main base plate 25, by round head screws 39. Film sprocket 38 rotates at one-eighth the speed of the motor 19.

Film drive gear 34 meshes with a pinion 40 on a drive shaft 41 of a high speed movement unit 42, thus the drive shaft 41 rotates at a 1:1 ratio with the motor 19. The movement unit 42 is of the conventional cyclic film feeding type which moves a feed-length of the film 10 intermittently and holds it in position at a film gate 43 for the exposure of each film frame. Film gate 43, rectangular in shape, is provided in a light shield 44 attached to the main base plate 25; and is positioned in the image plane of the focussing assembly 13. A fly wheel 45 for the movement unit 42 is attached to the lower end of the movement drive shaft 41.

A drum drive gear 54, similar to film drive gear 34, is keyed onto film drum shaft 32. Gear 54 enables shaft 32 to be driven by motor pinion 35. A spacer 46, mounted in a support 47 placed below the main base plate 25, and a ring 48 locate a drive pulley 49, above the drum driver gear 54, on the drum shaft 32. A small upper bearing 50 attached below main base plate 25 supports the upper end of drum shaft 32.

The take-up spindle 51 for the film 10 has a takeup sheave 52 which is joined to drive pulley 49 by a tension belt 53. As shown in Figure 4, tubes 15, passing through the back wall of camera box 12, guide the tension belt 53 along its path.

Roller guides 56 for the film 10 extend upwardly from a cover 57 which is attached to the main base plate 25 above the drive pulley 49.

Figure 4 shows the path the film takes through the camera. The 35 mm. film 10 is drawn from the 1000 foot feeding drum 14a past felt covered intake rollers 150 provided in drum bracket 21. Intake rollers 150 are placed close to the film opening 151 provided in the rear wall of the camera box 12, and the felt covering ensures that the opening 151 is light tight. The film 10 is then fed through the roller guides 56 to the movement unit 42 by the teeth on film sprocket 38. The film 10 is held against the teeth of film sprocket 38 by two sprocket guide assemblies 59. An electrically connected trip mechanism (not shown) is provided to stop the camera immediately in case of film breakage.

This completes the description of the film guiding and feeding mechanism.

Referring back to Figure 3, the reticle assembly 58, its associated optical reflecting system, and the main bearing mount is also shown there. The main bearing mount comprises an upper and lower race plate 61 and 62, respectively, and an outer race plate 65. Reticle plate 60, which holds the reticle 55, is positioned near the inside bottom of camera box 12 and rests by a boss 60a on the upper race plate 61 to which it is attached. The circular extension of upper race plate 61 is threaded so as to engage the internal thread of lower race plate 62 thus forming the complete inner race for the main bearing. Lower race plate 62 is then rigidly attached to the flange of cone-shaped mount 2 by flat head screws 63.

The outer race plate 65 is securely attached to the bottom of camera box 12. The inner periphery of the outer race plate 65 is so beveled that it rides on bearing balls 68 positioned between the upper and lower races 61 and 62. Thus, the camera box is enabled to be rotated in azimuth.

The reticle plate 60, the upper race plate 61 and the lower race plate 62 all have a central circular hole 64 therethrough concentric with the azimuth rotating axis of the camera. The bottom of motor 19 extends freely through this hole 64, thus enabling the camera box, to which it is fixed, to rotate with respect to the stationary reticle assembly 58 which, as described, is fixed to the tripod 4.

It is to be noted that an annular piece of felt 28, or similar resilient material, is used to prevent light from entering the camera box through the clearance in circular hole 64. Likewise, the entire camera box is made light-tight throughout.

The friction adjustment knob 65a is mounted on the flange of the cone shaped mount 2 on the bottom of the camera. Knob 65a is comprised of a spring loaded cork friction plate, with adjustable tension, and is used to vary the freedom with which the camera can be rotated about its azimuthal axis, or to hold the camera stationary.

Figure 6:
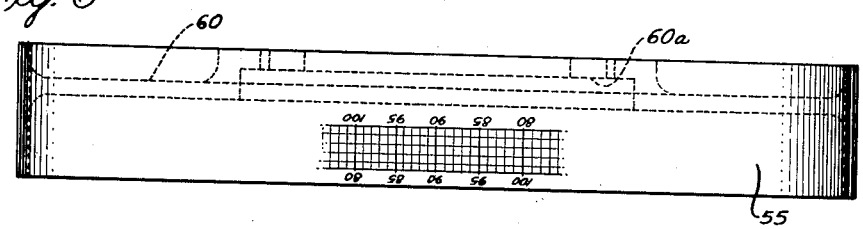
Figure 6 is a top view of the reticle as shown in Figure 5.
Figure 5:
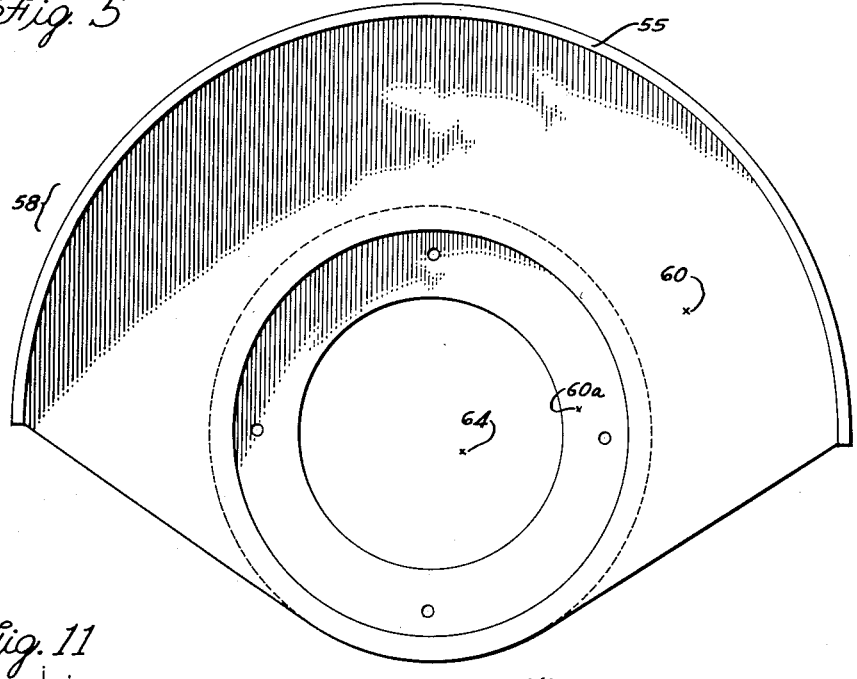
Figure 5 is a detailed plan view of the reticle plate.

Reticle 55 as shown in detail in Figures 5 and 6 is in the shape of a 180° circular arc and is preferably made integral with the reticle plate 60 so as to provide a rigid structure. The reticle arc 55 is machined so that it is held to be concentric with the boss 60a of the plate 60 by which it is held in the azimuth axis of the camera. An extremely accurate grid is engraved on the chemically blackened face of the reticle 55. The .001 inch engraved lines are graduated in degrees azimuth and zenith. It is indexed from 0° to 180° in azimuth and is held to within 15″ to the center or 90° point, i. e., the tolerance is not accumulative. The graduations are designated every five degrees from both ends of the arc. The grid is indexed for a 5 degree range in zenith. The reticle 55 and its base plate 60 is made from a low expansion alloy to ensure that temperature effects do not cause deviations in the grid to be reflected onto the film 10.

The reticle reflecting optical arrangement (Figure 3) for transposing the image of the reticle onto the film 10 is located near the front of the camera box 12 and consists of a 45° prism 66, a collimating lens 66a, and a half silvered optically flat glass 67 mounted together in an assembly such that their total reflecting angle is 180°. The prism 66 is mounted on the inside front wall of the camera box 12 so as to pick up a portion of reticle 55 and reflect it through the collimating lens 66a onto a glass 67 which is located in the optical path of the objective lens of the focussing assembly 13. Flat glass 67 reflects the image of reticle 55 onto the film 10, at the same time allowing the subject image from the objective lens to project through and onto the film. The light source for the reticle 55 is a 50 C. P. lamp 69 mounted directly below the optical arrangement.

A removable plug 74 in the camera box top 26 above the flat glass 67 is provided for enabling the operator to visually check the images to be photographed.

The shutter assembly 70 for the camera is positioned in the camera box 12 with respect to the film gate 43 as shown in Figures 4, 7 and 8.

The shutter assembly 70 is held just below the main base plate 25 by a bearing and coupling gear support 71 near the front of the shutter shaft 72, and a smaller bearing support 73 near the outer end of the shaft 72, as best shown in Figures 4 and 7.

A helical gear 75 on the main film drive shaft 31 (Figure 3) mates with a helical pinion 76 on the shutter shaft 72 (Figure 7) to form a direct right angled drive for the shutter assembly 70. The ratio of the shutter shaft 72 to the movement drive shaft 41 is 1:2.

The shutter is a double rotary disc, 77a and 77b, arrangement with four equally spaced 42½° apertures 78 in each disc. These apertures 78 are defined by an inner and outer arc and the portion of the radius between the arcs. The shutter discs 77a, 77b are positioned so that the diagonally opposite corners of the rectangular film gate 43, as shown in Figure 8, are just enclosed by the inner and outer arc of the apertures 78. The two shutter discs 77a, 77b are synchronized with the film movement unit 42 so that, when the apertures 78 of the shutter are in front of the film gate 43, the film 10 is at rest. The film moves when the opaque portion of the shutter discs cover the gate.

Figure 9:
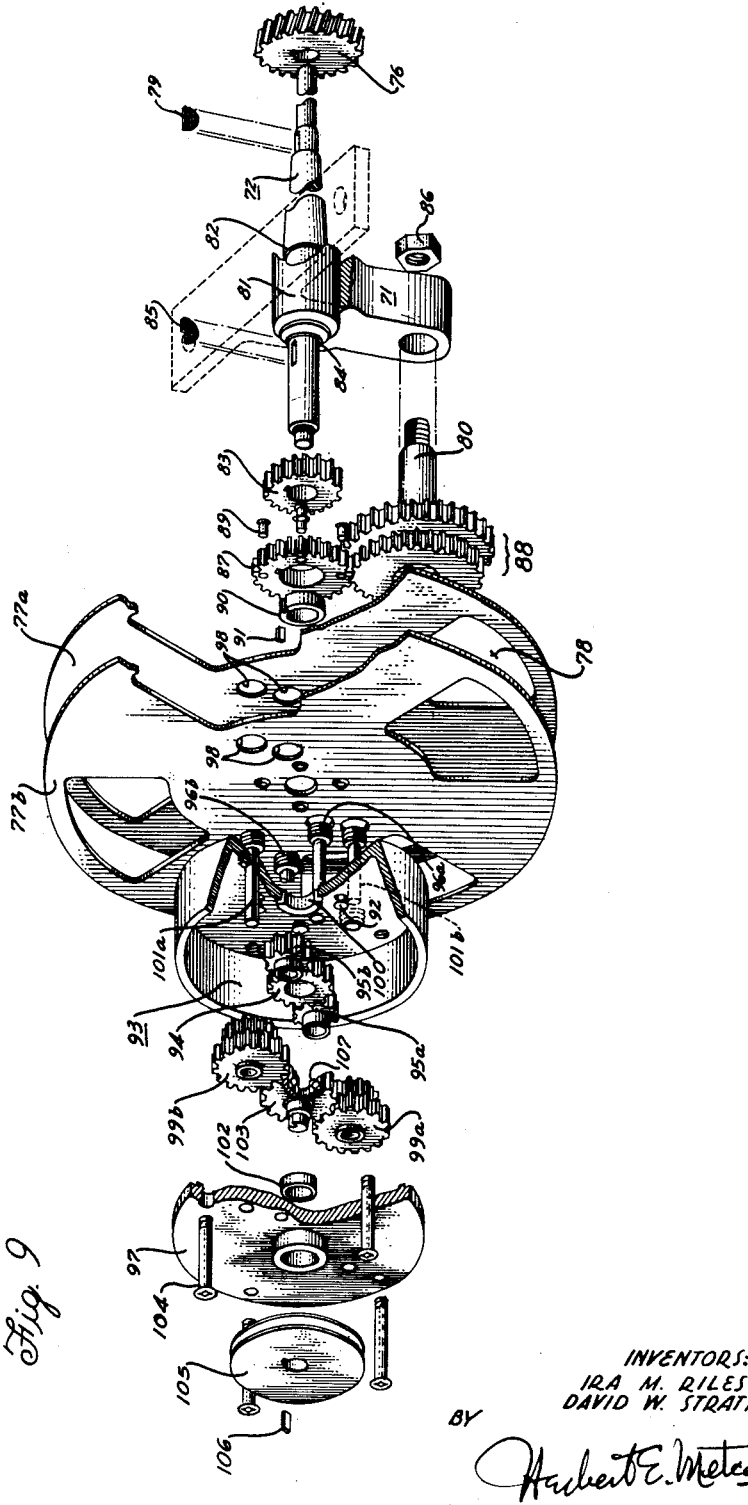
Figure 9 is an exploded view of the shutter assembly showing, in particular, the planetary gear drive system.

Referring to Figure 9, an exploded detailed view of the shutter assembly 70 is illustrated. There, the shutter shaft 72 is shown to have the helical pinion 76 near its rear end held by a key 79. The assembly 70 is driven by this pinion as previously noted. Near the front end of the shaft 72 a needle bearing 81 is fitted onto its first shoulder 82 by which the shaft is held in bearing and gear support 71 to be attached to the main base plate 25. A step-down gear 83 is held onto the next shoulder 84 by a modified key 85. The shutter shaft 72 is coupled to drive the rear shutter gear 87 of the shutter drive unit through a compound gear 88 which is held by the threaded end of its hub 90 and the nut 86 in the bearing and gear support 71. The gear relationship for these coupling gears is such that the shutter shaft 72 rotates twice as fast as the rear shutter gear 87. The rear shutter gear 87 is riveted to the rear shutter disc 77a by rivets 89. A sleeve bearing 90 held by a key 91 to the inside diameter of the rear shutter gear 87, enables gear 87 to be rotatably mounted on the shutter shaft 72 which extends therethrough.

A housing 93 has its base riveted to the front disc 77b of the shutter assembly by rivets 92. A housing top 97 is held onto the base of housing 93 by screws 104. Housing 93 encloses the planetary gearing system whose gear arrangement is such that it not only rotates the front shutter disc 77b at the same speed as the rear disc 77a but in addition enables the discs 77a, 77b to be moved relatively with respect to each other to change their combined aperture opening. A planetary drive gear 94 is press fitted onto the front end of the shutter shaft 72 which freely extends through both discs 77a, 77b, and through a bushing 100 provided at the axial center of the base of housing 93. Two idler gears 95a and 95b, located diametrically opposite each other, are driven by the planetary drive gear 94. These idler gears 95a, 95b are rotatably mounted on idler pins 96a and 96b held between the top 97 and the integral base of the housing 93 at a fixed radius from the center of rotation of the shutter assembly. The heads of pins 96a, 96b are threaded to engage the base of the housing 93. Cut-out holes 98 in the front and rear discs enable the pins 96a, 96b to pass therethrough for ease in assembly.

Two compound spur gears 99a and 99b are similarly held in the housing 93 by pins 101a and 101b located at a fixed radius from the center of rotation of the shutter assembly 70. Each of the compound spur gears 99a and 99b is in such a position that its rear half can be driven by one of the idler gears 95a and 95b, respectively.

At the axial center of housing top 97 a bearing 102 is provided in which in journalled the hub of an adjusting gear 103 which is located just inside the housing 93. Adjusting gear 103 meshes with both the front halves of compound spur gears 99a and 99b.

A shutter pulley 105 is attached outside housing 93 onto the outwardly extending hub of adjusting gear 103 by a square key 106. On the rear side of adjusting gear 103 a thrust ball bearing 107 is seated for rotatably supporting the reduced diameter front end of shutter shaft 72.

Thus it is noted that as the shutter shaft 72 is rotated both discs 77a, 77b are driven together at the same speed as a unit.

The rear disc 77a riveted to the rear shutter gear 87 is driven by step-down gear 83 on shutter shaft 72 through the compound gear 88; and the front disc 77b is driven through the planetary drive gear 94 on shutter shaft 72, then through the planetary idler gears 95a and 95b which in turn drive the compound spur gears 99a, 99b respectively to rotate the housing 93 (to which the front disc 77b is riveted) at the speed with which the center of spur gears 99a, 99b rotate about the normally stationary adjusting gear 103. Whenever it is desired to change the combined aperture opening of the shutter, i. e., change the position of the discs 77a, 77b relative to each other, an incremental rotation of adjusting gear 103 by a shutter pulley 105 causes the compound spur gears 99a and 99b to rotate on their pins 101a, 101b with respect to the housing 93 and hence rotate the front disc 77b with respect to the rear disc 77a. Dependent on whether this incremental rotation is additive or subtractive to the already existent rotation of the center of spur gears 99a, 99b about the shutter assembly axis, the aperture increases or decreases. The use of a 4 to 1 gear ratio between the movement drive shaft 41, which drives the movement 42, and the four-apertured shutter discs 77a, 77b results in four film frames coming up for exposure each revolution of the shutter assembly, i. e., each of film frames is exposed for the time duration determined by one of the variable apertures 78.

The pulley and cable arrangement for changing the shutter aperture independently or in accordance with the film frame speed will next be described.

As shown in Figure 10 a view of the lower compartment of the camera box reveals the two sets of cable arrangements, leading to both the shutter pulley 105, just described, and a rheostat pulley 109 for adjusting the field and armature of the motor 19. Rheostat pulley 109 is held to the side wall of the camera box 12 by a rheostat bracket 124. The two sets of cables are tied in together by the double control knob assembly 22. The arrangement of the cables and their connections is such that they do not interfere with the removal of the main boss plate 25.

Figure 11:
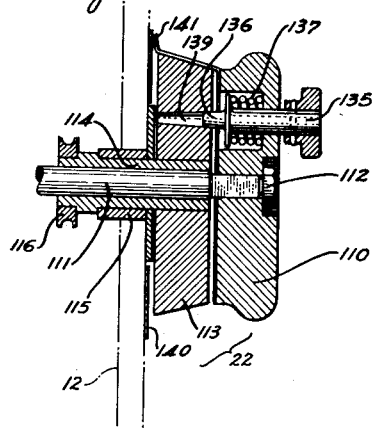
Figure 11 is a cross sectional view of the double control knob.

A cross sectional view of the double control knob assembly 22 is shown in detail in Figure 11. The outer control knob 110, known herein as the shutter control knob, is held by a square hole in its center onto the square cross sectional end portion of the shutter control shaft 111 by a retaining nut 112. The inner control knob 113 herein designated as the rheostat control knob, also is held by a square hole in its center which mates with the squared outer surface of a hollow rheostat control shaft 114 whose inner surface freely rotates about shutter control shaft 111. Rheostat control shaft 114 is journalled in a bearing 115 mounted in the rear wall of camera box 12. Immediately, on the inside end of rheostat control shaft 114, a rheostat drive pulley 116 is attached. As shown in Figure 10 an endless cable drive 118 is used for transferring the rotation of rheostat control shaft 114, along the inside contour of the camera box 12, to the rheostat shaft 117. The cable 118, makes at least two complete revolutions about the vertical rheostat drive pulley 116 in order to ensure that no slipping occurs. The upper and lower ends of the cable 118 are then curved at almost a right angle at the inside corner of the camera box 12 by a double horizontally arranged pulley assembly 119 attached to the side wall of the camera box. The cable 118 then is guided through a second horizontal double pulley assembly 120 which directs it onto a third vertically disposed set of pulleys 121 which diverts the cable 118 to the driven rheostat pulley 109 on the rheostat shaft 117. The cable, as before, makes at least two complete revolutions about the drive rheostat pulley 109.

The shutter control shaft 111 extends horizontally into the lower compartment of camera box 12 to terminate just under the end of main base plate 25. A bearing support 123 for the shutter control 111 is provided underneath the shelf 16 of the camera box 12. Near the front end of shutter control shaft 111 a worm 125 is provided for engaging a worm wheel 126 keyed to the end of an intermediate pulley shaft 127. A pulley housing 129 secured beneath the main base plate 25 provides a two bearing support for intermediate pulley shaft 127 which is vertically disposed and has two intermediate pulleys 131 fixed thereon from which the two ends of a shutter cable 130 are fed. The arrangement of the shutter cable 130 around the two intermediate pulleys 131 is such that, as the intermediate shaft 127 is rotated, one of the intermediate pulleys 131 unwinds and the other winds the ends of shutter cable 130. The shutter cable is then wound about a set of horizontal pulleys 132 which directs the shutter cable 130 at substantially a right angle so as to clear the bracket 29 (see Figure 4). The shutter cable is then wound around another set of horizontal pulleys 133 located near the inside front wall of the camera box 12. From there the shutter cable 130 is led to wrap around the shutter pulley 105 previously described. The pulley 105 on the shutter assembly is so rigged that it rotates at a ratio of 1 to 7 with the pulley 109 on the rheostat.

Figure 12:
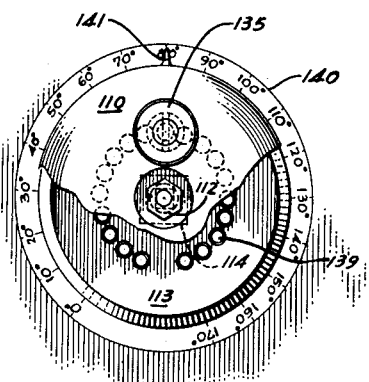
Figure 12 is a plan view of the control knob showing the calibrated dial.

Referring back to Figures 11 and 12, it is noted that a knurl headed plunger 135 is positioned off center on the outside of the shutter control knob 110. Plunger 135 passes through the outer knob 110 and the tapered end 136 of its shaft is urgingly extended by spring 137 into one of the tapered holes 139 provided in the rheostat knob 113. Inner knob 113 is provided with 19 tapered holes 139, their positions corresponding to the angular setting marks indicated by the dial 140. Dial 140 is fixed to the rear wall of the camera box 12 and is positioned to be concentric with the double knob assembly 22.

As noted, a pointer 141 is attached to the base of the shutter control knob 110 on the same radial line with the plunger 135.

The index lines for the angular aperture settings of the dial 140 are spaced in intervals of 17° 30' plus or minus 15'', and the tolerance is not cumulative. These index lines correspond to the fixed shutter aperture settings at which the camera shutter can be maintained.

Referring back to Figure 4, a tachometer 143 is shown to be mounted on the back of the camera on the side opposite the double control knob assembly 22. The body of the tachometer 143 extends under the cover 134 provided on the shelf 16 of the box 12 and it is driven by a flexible cable 144 which is coupled by coupling 108 to the rear end of the shutter shaft 72. The tachometer 143 is calibrated (not shown) to indicate the frames per second speed and the motor R. P. M. of the camera.

Thus, when the plunger 153 is disengaged the rheostat 18 and the combined aperture of the shutter discs 77a, 77b may be independently set by the control knob 113 and 110 respectively. When the plunger 135 is engaged, the rheostat and the aperture setting can be simultaneously changed to maintain a constant exposure time. These changes can be made either while the camera is running or standing still.

To further facilitate the operation, a frame counter 147 is mounted on the top 26 of the camera box 12. This counter 147 is driven by a tongued shaft 148 driven directly off the film sprocket 38 as shown in Figure 3. Geared 8 to 1, it records the number of frames or footage of film used up. A reset knob 149 is mounted on the end of this counter.

Figure 15 shows a graph that illustrates the action of the double control knob assembly 22. The ordinate of the graph corresponds to the combined opening in degrees of the apertures of the shutter as indicated on dial 140 of the control knobs. The abscissa of the graph indicates the frames per second speed of the film as would be read off the tachometer 143 by the operator. The fractional time parameters such as $\frac{1}{34}$ sec., $\frac{1}{380}$ sec. etc., correspond to constant exposure times desired for the film. For instance, assume that the light on the object to be photographed and the setting of the lens focusing assembly 13 requires that a film exposure time of $\frac{1}{380}$ second be maintained. The operator running the camera, sets the frames per second to any convenient value, say, for example, 32, by turning the rheostat control knob 113, with the plunger 135 pulled out, and observing the reading on tachometer 143. Then, with the plunger 135 still pulled out, the operator turns the shutter control knob 110 until pointer 141 is opposite reading 30° on the dial 140; he then locks the two knobs together by releasing plunger 135 into the corresponding locking hole 139.

The operator is now running the camera at point X of the $\frac{1}{380}$ sec. parameter of the graph of Figure 15. By rotating the double control knob as a unit, the operator while the camera is running, can now change the speed of the film at will, and the corresponding change in the shutter aperture will be such that the $\frac{1}{380}$ sec. parameter of the graph will be traversed, thus maintaining the desired constant exposure time for the film.

The extreme exposure times of the camera as obtained by the preferred embodiment of the shutter and motor mechanism is a maximum of $\frac{1}{34}$ seconds and a minimum of $\frac{1}{1585}$ seconds. These limiting exposure parameters are indicated on the graph of Figure 15. Any time exposure parameters in between these extremes can be obtained and maintained by knowing at least one pair of coordinates at which to set the control knobs.

It is to be noted that the arrangement of the film drum in a horizontal position has been made in order to place the length of the standard film frame in a vertical position. By this means, a maximum zenith range for the movie camera, which is primarily adapted for azimuth tracking, can be obtained with standard components. In order to make maximum use of the azimuth range, it is desirable when setting up the camera to line up the object to be photographed with the zero degree marking on either end of the arc of the reticle 55. This is facilitated by removable plug 74 placed in the camera box above the flat glass 67 on which both the subject image and the reticle image are superimposed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In a movie camera, the combination of film driving and shutter mechanism including a motor for running said mechanisms, a rheostat for controlling the speed of said motor, a film gate, a cyclic film feeding movement driven by said motor for intermittently feeding film past said gate, a shutter comprising two apertured rotary discs for controlling the opening time of said film gate, said motor driving one of said discs through a coupling gear, said motor driving the other of said discs through a planetary gear system, an adjusting gear in said planetary system for varying the relative positions of said discs, a shutter control shaft, a hollow rheostat control shaft concentric with said shutter control shaft, a first pulley and cable arrangement for connecting said rheostat to said hollow rheostat control shaft, a second pulley and cable arrangement for connecting said shutter adjusting gear to said shutter control shaft, a shutter control knob fixed on said shutter control shaft, a rheostat control knob fixed on said rheostat control shaft, said knobs being immediately adjacent each other at the ends of said shafts, and means for manually locking and unlocking said shutter control knob and said rheostat control knob without disturbing operation of said camera.

2. Apparatus in accordance with claim 1 wherein said means for locking said shutter control knob to said rheostat control knob comprises a spring loaded plunger mounted in one of said control knobs for engaging indexing holes arcuately positioned in the other of said control knobs.

IRA M. RILES.
DAVID W. STRATTON.

References Cited in the file of this patent

UNITED STATES PATENTS

| Number | Name | Date |
| --- | --- | --- |
| 669,705 | Reeh | Mar. 12, 1901 |
| 1,297,703 | Leonard | Mar. 18, 1919 |
| 1,432,570 | Roux | Oct. 17, 1922 |
| 1,525,346 | Warren | Feb. 3, 1925 |
| 1,839,587 | Raby et al. | Jan. 5, 1932 |
| 1,864,896 | Egy | June 28, 1932 |
| 1,884,605 | Dina | Oct. 25, 1932 |
| 1,914,664 | Fear | June 20, 1933 |
| 2,045,260 | Berggren | June 23, 1936 |
| 2,111,516 | Roux | Mar. 15, 1938 |
| 2,210,090 | Lutz et al. | Aug. 6, 1940 |
| 2,376,302 | Widmer | May 15, 1945 |
| 2,396,701 | Holschuh et al. | Mar. 19, 1946 |
| 2,459,206 | Wheeler | Jan. 18, 1949 |
| 2,521,667 | Neyhart | Sept. 5, 1950 |

FOREIGN PATENTS

| Number | Country | Date |
| --- | --- | --- |
| 518,418 | Great Britain | Feb. 19, 1940 |